Aug. 10, 1948.　　　　F. N. SMITH　　　　2,446,616
BEARING STRUCTURE FOR CONVEYER
ROLLERS AND THE LIKE
Filed Dec. 7, 1945

Inventor
Franklin N. Smith

Attorneys

Patented Aug. 10, 1948

2,446,616

UNITED STATES PATENT OFFICE 2,446,616

BEARING STRUCTURE FOR CONVEYER ROLLERS AND THE LIKE

Franklin N. Smith, Cedar Rapids, Iowa

Application December 7, 1945, Serial No. 633,317

2 Claims. (Cl. 308—187.1)

My invention relates to improved lubricated bearing means for conveyor idler rollers and the like, the primary object of the invention being to provide simplified and more efficient structure which assures a constant feed of lubricant to the bearings while operating to positively exclude and resist the intrusion of dirt and other foreign matter.

Other important objects and advantages of my invention will be apparent from the following description and the appended drawing, wherein a merely illustrative embodiment of the invention is set forth in detail.

Figure 1:
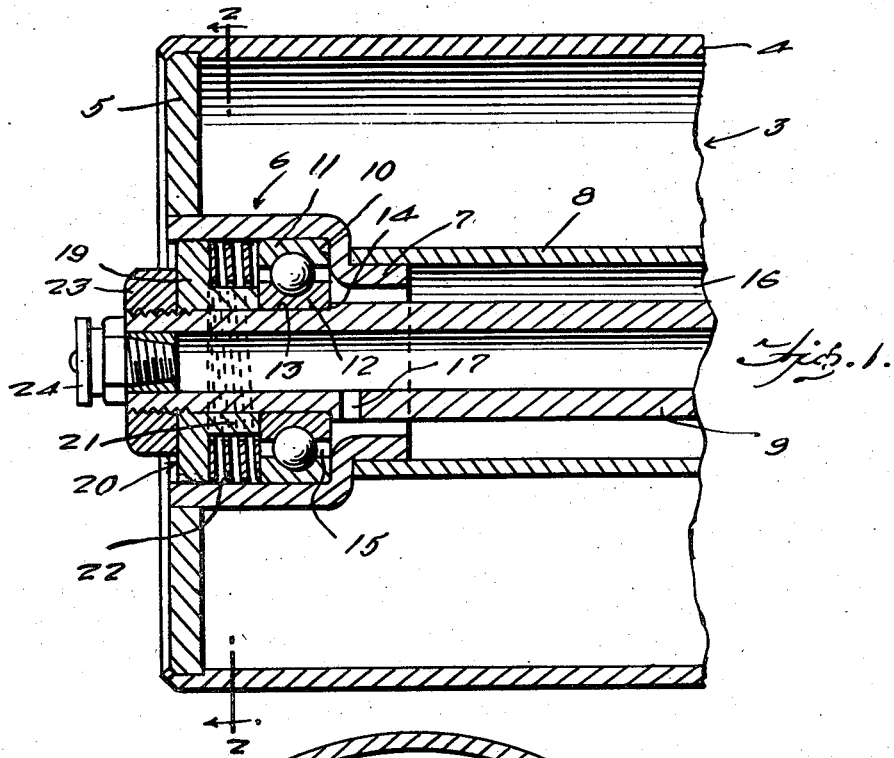
Figure 1 is a fragmentary general vertical longitudinal sectional view showing application of the invention to a belt conveyor idler roller.
Figure 2:
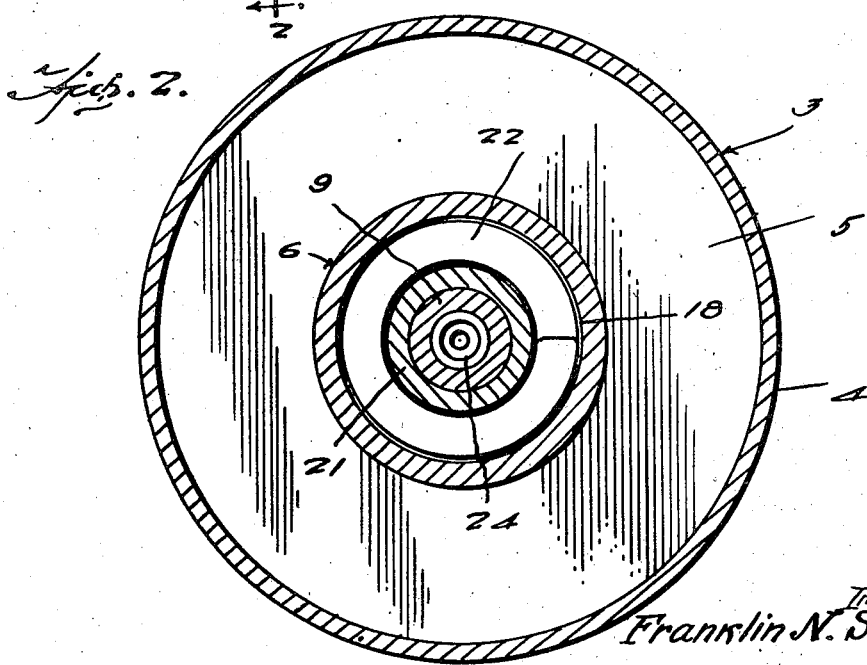
Figure 2 is a transverse section taken on the line 2—2 of Figure 1.

Referring in detail to the drawing, the numeral 3 generally designates the belt conveyor idler roller or other rotary element with which my improved bearing means may be applied or incorporated, the said roller having the outer cylinder 4 secured at its ends to heads 5, in the center of which are inserted the cup-shaped bearing housing 6 having the reduced inner portion 7 fitted into the axial tube 8 which is circumferentially spaced around the tubular shaft 9, the reduced portion 7 of the bearing housing also spacedly and concentrically surrounding the shaft 9.

Against the shoulder 10 defined by the reduced end of the bearing housing is the roller or ball bearing comprising the outer race 11 which directly abuts said shoulder, and the inner race 12 which fits on the reduced portion 13 of the tubular shaft 9 and abuts the shoulder 14. The annular space 15 between the bearing races is in communication with the space 16 between the tube 8 and the shaft 9, and through the hole 17 to receive grease or oil from the interior of the tubular shaft 9.

The outer end of the bearing housing 6 has an internal smooth surface to accommodate a cylindrical surface on the outer enlarged diameter of the flange 19 of the bushing 20 which has an inner reduced sleeve 21. The space between the flange 19 and the bearing provides an unusually large capacity lubricant containing chamber in direct feeding relation to the bearing.

On the sleeve 21 is a wide flat helical spring 22, which spirals in a direction opposite that of the rotation of the roller 3 in order to feed the grease in an axially outward direction against the flange 19 of the bushing and thereby resist the intrusion of dirt and other foreign matter into the bearing structure through or around the bushing. The flatness and relatively great width of the spring 22 and its radial extension substantially across the annular space between the sleeve 21 and the sidewall of the bearing, provides positive lubricant feeding action of the spring throughout the cross section of said annular space, with consequent greater effectiveness. The inner end of the spring may bear against the bearing races 11 and 12.

The helical spring 22 is fixed as by welding or other suitable means, to the flange 19 of the bushing so that it will turn with the bushing, and for similar reasons the nut 23 is similarly fixed to the flange 19 of the bushing. The nut 23 is threaded on the axially outward end of the tubular shaft 9, to hold the bushing and spring in place, with the inner end of the sleeve 21 against the inner bearing race 12, once the bushing has been turned in to that position.

A pressure grease fitting 24 is threaded in the axially outward end of the tubular shaft 9 to enable introducing the lubricant under pressure into the assembly. It is obvious that the turning of the bearing 6 relative to the spring 22 tends to rotate the grease in the housing in the same direction while the spring remains stationary. This gives the same effect as if the bearing housing were stationary and the spring rotated, whereby the grease is forcibly fed toward the flange for the desired sealing effect. The forced feeding of the grease draws the grease through the bearings, thereby providing means for forced circulation of the lubricant to the bearings of the idlers. Bearing mountings of this type are particularly adapted for troughing rollers and idlers, particularly of belt conveyors and the like.

I claim:

1. In a bearing assembly comprising a hollow shaft, a cup-shaped housing surrounding an end of said shaft, a ball bearing operatively disposed between said shaft and said housing, said shaft and housing having annular shoulders locating said ball bearing relative thereto, a bushing having a flange surrounding said shaft within said housing, said bushing holding said bearing against said shaft shoulder, the flange of said bushing peripherally contacting said housing and being spaced from said bearing to provide at the outer end of said bearing an annular space within said housing, and a helical spring within said annular space loosely circumposed upon said bushing, said spring being spiraled in a direction opposite to the direction of rotation of said housing relative to said shaft to thereby forcibly feed lubricant present in the latter space toward the bearing.

2. In a bearing assembly comprising a hollow shaft adapted to contain lubricant, an open ended hollow tube arranged concentrically with respect to said shaft and spaced from the latter so as to form a space therebetween, there being a hole in said shaft for establishing communication between the latter and said space, a cup-shaped housing having a reduced inner portion surrounding an end of said shaft, said reduced portion being received within the complemental end of said tube, a ball bearing operatively disposed between said shaft and said housing, said shaft and housing having annular shoulders locating said ball bearing relative thereto, a bushing having a flange surrounding said shaft within said housing, said bushing holding said bearing against said shaft shoulder, the flange of said bushing peripherally contacting said housing and being spaced from said bearing to provide at the outer end of said bearing an annular space within said housing, and a helical spring within said annular space loosely circumposed upon said bushing, said spring being spiraled in a direction opposite to the direction of rotation of said housing relative to said shaft to thereby forcibly feed the lubricant present in the latter space toward the bearing.

FRANKLIN N. SMITH.

REFERENCES CITED

The following references are of record in the file of this patent:

UNITED STATES PATENTS

| Number | Name | Date |
|---|---|---|
| 608,698 | Meeker | Aug. 9, 1898 |
| 1,655,335 | Pfleegor | Jan. 3, 1928 |